United States Patent
Logvinov et al.

(10) Patent No.: US 12,128,779 B2
(45) Date of Patent: Oct. 29, 2024

(54) METHODS, DEVICES, AND SYSTEM FOR GROUP ELECTRIC VEHICLE (EV) CHARGING EVENT

(71) Applicant: IoTecha Corp., Cranbury, NJ (US)

(72) Inventors: Oleg Logvinov, Weston, CT (US); Kimberly Sarubbi, Brentwood, TN (US); Adrian Weidmann, Deephaven, MN (US)

(73) Assignee: IoTecha Corp., Cranbury, NJ (US)

( * ) Notice: Subject to any disclaimer, the term of this patent is extended or adjusted under 35 U.S.C. 154(b) by 0 days.

(21) Appl. No.: 18/045,008

(22) Filed: Oct. 7, 2022

(65) Prior Publication Data

US 2023/0113027 A1 Apr. 13, 2023

Related U.S. Application Data

(63) Continuation of application No. PCT/US2022/077773, filed on Oct. 7, 2022.
(Continued)

(51) Int. Cl.
*B60L 53/30* (2019.01)
*B60L 53/31* (2019.01)
(Continued)

(52) U.S. Cl.
CPC ............ *B60L 53/305* (2019.02); *B60L 53/31* (2019.02); *B60L 53/51* (2019.02); *B60L 53/66* (2019.02);
(Continued)

(58) Field of Classification Search
CPC .......... B60L 53/31; B60L 53/51; B60L 53/66; B60L 53/305; H02J 3/381; H02J 2300/24; H02S 20/30
See application file for complete search history.

(56) References Cited

U.S. PATENT DOCUMENTS

| | | | |
|---|---|---|---|
| 2010/0263709 A1* | 10/2010 | Norman | F24S 30/452 |
| | | | 136/246 |
| 2011/0130885 A1* | 6/2011 | Bowen | B60L 53/65 |
| | | | 700/291 |

(Continued)

FOREIGN PATENT DOCUMENTS

| | | |
|---|---|---|
| CN | 203780389 U | 8/2014 |
| EP | 2292877 A1 | 3/2011 |

(Continued)

OTHER PUBLICATIONS

ISA/US, International Search Report and Written Opinion for corresponding PCT Patent Application No. PCT/US2022/077773, mailed Jan. 31, 2023, 14 pages.
(Continued)

*Primary Examiner* — Richard Isla
*Assistant Examiner* — Johali A Torres Ruiz
(74) *Attorney, Agent, or Firm* — NK Patent Law (57) ABSTRACT

Disclosed herein are methods, devices, and systems for providing electric vehicle (EV) group charging events. According to one embodiment, an apparatus includes a plurality of electric vehicle (EV) chargers configured to be coupled with an energy source, and a computing device coupled with the plurality of EV chargers. In another embodiment, a method receiving a scheduling availability for the apparatus, receiving user data associated with a plurality of EV users, and determining a first EV user of the plurality of EV users to invite to an EV group charging event based on the user data, and transmitting an invitation for the EV group charging event to a user device associated with the first EV user.

21 Claims, 6 Drawing Sheets

FLOW CHART 500

Related U.S. Application Data (60) Provisional application No. 63/253,696, filed on Oct. 8, 2021.

(51) Int. Cl.
*B60L 53/51* (2019.01)
*B60L 53/66* (2019.01)
*B60L 53/67* (2019.01)
*H02J 3/38* (2006.01)
*H02S 20/30* (2014.01)

(52) U.S. Cl.
CPC .............. *B60L 53/67* (2019.02); *H02J 3/381* (2013.01); *H02S 20/30* (2014.12); *H02J 2300/24* (2020.01)

(56) References Cited

U.S. PATENT DOCUMENTS

| | | | | |
|---|---|---|---|---|
| 2011/0213656 | A1* | 9/2011 | Turner | B60L 53/665 320/109 |
| 2014/0201770 | A1* | 7/2014 | Schraga | H04N 21/44213 725/32 |
| 2014/0316939 | A1 | 10/2014 | Uyeki | |
| 2016/0125458 | A1* | 5/2016 | Enriquez | G06Q 30/0267 705/14.27 |
| 2016/0364658 | A1* | 12/2016 | Khoo | G06Q 10/1093 |
| 2017/0063290 | A1* | 3/2017 | Kurlagunda | B60L 8/003 |
| 2019/0308509 | A1* | 10/2019 | Herman | B60L 53/35 |
| 2019/0337406 | A1 | 11/2019 | Mingenbach et al. | |
| 2019/0351783 | A1* | 11/2019 | Goei | G06Q 10/1095 |
| 2020/0127485 | A1 | 4/2020 | Friesen | |
| 2021/0039516 | A1 | 2/2021 | Brombach et al. | |
| 2022/0161705 | A1* | 5/2022 | De Macedo | B60K 17/02 |

FOREIGN PATENT DOCUMENTS

| | | |
|---|---|---|
| JP | 2010277381 A | 12/2010 |
| KR | 20190143748 A | 12/2019 |

OTHER PUBLICATIONS

WIPO; PCT International Preliminary Report on Patentability for corresponding International patent application No. PCT/US2022/077773 issued on Apr. 9, 2024, 11 pages.

* cited by examiner

METHODS, DEVICES, AND SYSTEM FOR GROUP ELECTRIC VEHICLE (EV) CHARGING EVENT

PRIORITY CLAIM

This application is a continuation application of PCT Patent Application No. PCT/US2022/077773 filed Oct. 7, 2022, which claims the benefit of U.S. Provisional Patent Application Ser. No. 63/253,696 filed Oct. 8, 2021; the entire contents of which are all hereby incorporated herein by reference.

TECHNICAL FIELD

The present invention relates generally to the field of electric vehicle (EV) chargers. More particularly, methods, devices, and systems are disclosed for EV group charging events.

BACKGROUND

With the growth of electric vehicles (EVs), the EV charging equipment market is expected to have a compound annual growth rate (CAGR) exceeding 27 percent through 2025. In addition to the public chargers, users are installing home-based EV chargers for convenience. EV owners and users have to find new options for charging their Evs that have limited impact on their daily activities.

Accordingly, there remains a need for methods, devices, and systems for facilitating charging of Evs when home-based charging is not practical.

SUMMARY

Disclosed herein are methods, devices, and systems for providing group electric vehicle (EV) charging events.

According to one embodiment, an apparatus includes a plurality of electric vehicle (EV) chargers configured to be coupled with an energy source, and a computing device coupled with the plurality of EV chargers.

In some embodiments, the plurality of EV chargers may be configured to simultaneously charge a plurality of Evs.

In some embodiments, the apparatus may further include the energy source.

In some embodiments, the apparatus may be a mobile apparatus.

In certain embodiments, the mobile apparatus may be a trailer. In other embodiments, the mobile apparatus may be a self-propelled vehicle. In still other embodiments, the mobile apparatus may be a watercraft.

In some embodiments, the apparatus may further include an inverter electrically coupled between the plurality of EV chargers and the energy source. In certain embodiments, the inverter may be a split-phase inverter.

In some embodiments, the energy source may include a solar panel array. In further embodiments, the solar panel array may be adjustable on at least one axis. In further embodiments, the solar panel array may be adjustable on at least two axes. In further embodiments, the solar panel array may be retractable for movement of the apparatus from a first location to a second location. In further embodiments, the solar panel array may be configured for providing shelter from weather to the plurality of Evs. In further embodiments, the solar panel array may be configured for providing shade to the plurality of Evs.

In some embodiments, the energy source may include a battery cabinet. In certain embodiments, the battery cabinet may be a lead acid battery cabinet. In further embodiments, the battery cabinet may be a lithium battery cabinet.

In some embodiments, the energy source may include an electric generator. In certain embodiments, the electric generator may be a direct current (DC) electric generator. In other embodiments, the electric generator may be an alternating current (AC) electric generator.

In some embodiments, the energy source may be external to the apparatus. In certain embodiments, the energy source may be a power distribution line. In further embodiments, the energy source may be an off-grid energy source. In still further embodiments, the off-grid energy source may be a solar farm, a wind farm, and/or the like.

In some embodiments, the apparatus may further comprise an electrical plug electrically coupled with the plurality of EV chargers.

In some embodiments, the computing device may be configured for monitoring and controlling the plurality of EV chargers.

In some embodiments, the computing device may be further configured for monitoring the energy source.

In some embodiments, the computing device may be configured to provide media content to a plurality of users associated with the plurality of Evs. In certain embodiments, the media content may be determined based on a common attribute associated with a plurality of users associated with the plurality of Evs.

In some embodiments, the computing device may be configured for (1) receiving a plurality of identifiers associated with a plurality of client devices associated with the plurality of users, (2) receiving a plurality of profiles associated with the identifiers, and (3) determining the common attribute based on the plurality of profiles. In further embodiments, computing device may be further configured for further determining the common attribute based on a plurality of purchasing histories associated with the plurality of profiles. In still further embodiments, computing device may be configured for determining a current location of the apparatus, and determining the common attribute based on the current location.

In some embodiments, the computing device may be configured for determining a current event based on a current time and a current location of the apparatus, and determining the common attribute based on the current event. In certain embodiments, the current event may be a sporting event, a concert, a festival, a farmers' market, a flea market, a local community center event, a local convenience store event, and or the like.

In some embodiments, the apparatus may further include a digital signage device electrically coupled with the computing device. The digital signage device may be configured to display the media content.

In some embodiments, the apparatus may further comprise a store having for sale items. In certain embodiments, the store may be a convenience store, a grocery store, a drug store, a gift store, a food stand, a food truck, and or the like.

In some embodiments, the apparatus may further comprise facilities to provide services. In certain embodiments, the services may include restaurant services, hair salon services, nail salon services, massage services, medical services, dental services, tutorial services, counseling services, physical therapy services, entertainment servicers, religious services, and/or the like In some embodiments, the apparatus may further comprise a wide area network (WAN) interface electrically coupled with the computing device. The computing device may be further configured for receiving the media content via the WAN interface. The WAN may also include any combination of 2G, 3G, 4G, and 5G networks. In some embodiments the WAN may include Data Over Cable Service Interface Specification (DOCSIS) networks and/or fiber networks such as passive optical networks (PONs).

In some embodiments, the apparatus may further comprise a wireless local area network (WLAN) interface electrically coupled with the computing device. The computing device may be further configured for providing the media content to the plurality of users via the WLAN interface. In certain embodiments, the WLAN interface may include circuitry compliant to at least one version of an Institute of an Electrical and Electronics Engineers® (IEEE®) 801.11 standard, an IEEE® 802.15.4 standard, a Bluetooth® Special Interest Group (SIG) standard, a Z-Wave® Alliance standard, a LoRA® Alliance standard, and/or the like In some embodiments, the media content may be an advertisement, a product promotion, a product placement, and/or the like.

In some embodiments, the computing device may be configured to provide a point of sale (POS) for providing EV charging.

In another embodiment, a mobile off-grid energy source includes a plurality of batteries, an inverter electrically having an input electrically coupled with the plurality of batteries, a plurality of electrical outlets electrically coupled with an output of the inverter, and a computing device configured for monitoring the plurality of batteries and controlling the inverter.

In some embodiments, the mobile off-grid energy source may further include a rectifier having an output electrically coupled with the plurality of batteries.

In some embodiments, the mobile off-grid energy source may be configured to be electrically coupled with a plurality of EV chargers.

In some embodiments, the mobile off-grid energy source may be a trailer. In other embodiments, the mobile off-grid energy source may be a self-propelled vehicle. In still other embodiments, the mobile off-grid energy source may be a watercraft.

In some embodiments, the mobile off-grid energy source may further include a solar panel array electrically coupled with the plurality of batteries. In further embodiments, the solar panel array may be adjustable on at least one axis. In further embodiments, the solar panel array may be adjustable on at least two axes. In still further embodiments, the solar panel array may be retractable for movement of the mobile off-grid energy source from a first location to a second location. In still further embodiments, the solar panel array may be configured for providing shelter from weather to a plurality of Evs being charged by the plurality of EV chargers. In still further embodiments, the solar panel array may be configured for providing shade to the plurality of Evs.

In some embodiments, the computing device may be configured to provide media content to a plurality of users associated with a plurality of devices receiving power from the mobile off-grid energy source. In further embodiments, the media content may be determined based on a common attribute associated with the plurality of users. In still further embodiments, the media content may be at least one of an advertisement, a product promotion, a product placement, and/or the like.

In some embodiments, the computing device may be configured for (1) receiving a plurality of identifiers associated with a plurality of client devices associated with the plurality of users, (2) receiving a plurality of profiles associated with the identifiers, and (3) determining the common attribute based on the plurality of profiles. In further embodiments, computing device may be further configured for further determining the common attribute based on a plurality of purchasing histories associated with the plurality of profiles. In still further embodiments, computing device may be configured for determining a current location of the mobile off-grid energy source, and determining the common attribute based on the current location.

In some embodiments, the computing device may be configured for determining a current event based on a current time and a current location of the mobile off-grid energy source, and determining the common attribute based on the current event. In certain embodiments, the current event may be at least one of a sporting event, a concert, a festival, a farmers' market, a flea market, a local community center event, a local convenience store event, and or the like.

In some embodiments, the computing device may be configured to provide a POS for providing EV charging.

In some embodiments, the mobile off-grid energy source may further comprise a wide area network (WAN) interface electrically coupled with the computing device. The computing device may be further configured for receiving the media content via the WAN interface. The WAN may also include any combination of 2G, 3G, 4G, and 5G networks. In some embodiments the WAN may include Data Over Cable Service Interface Specification (DOCSIS) networks and/or fiber networks such as passive optical networks (PONs).

In some embodiments, the mobile off-grid energy source may further comprise a wireless local area network (WLAN) interface electrically coupled with the computing device. The computing device may be further configured for providing the media content to the plurality of users via the WLAN interface. In certain embodiments, the WLAN interface may include circuitry compliant to at least one version of an Institute of an Electrical and Electronics Engineers® (IEEE®) 801.11 standard, an IEEE® 802.15.4 standard, a Bluetooth® Special Interest Group (SIG) standard, a Z-Wave® Alliance standard, a LoRA® Alliance standard, and/or the like In some embodiments, the mobile off-grid energy source may further include a digital signage device electrically coupled with the computing device. The digital signage device may be configured to display the media content.

In some embodiments, the mobile off-grid energy source may further comprise a store having for sale items. In certain embodiments, the store may be at least one of a convenience store, a grocery store, a drug store, a gift store, a food stand, a food truck, and or the like.

In some embodiments, the mobile off-grid energy source may further comprise facilities to provide services. In certain embodiments, the services may include restaurant services, hair salon services, nail salon services, massage services, medical services, dental services, tutorial services, counseling services, physical therapy services, entertainment servicers, religious services, and/or the like.

In another embodiment, a method for facilitating an EV group charging event is disclosed. The method includes (1) receiving a scheduling availability for an apparatus, (2) receiving user data associated with a plurality of EV users, (3) determining a first EV user of the plurality of EV users to invite to the EV group charging event based on the user data, and (4) transmitting an invitation for the EV group charging event to a user device associated with the first EV user. The apparatus includes a plurality of EV chargers configured to be coupled with an energy source and a computing device coupled with the plurality of EV chargers.

In some embodiments, the plurality of EV users may be associated with a plurality of home-based EV chargers. In further embodiments, the plurality of home-based EV chargers may be located within a five-mile radius of a planned location for the EV group charging event. In still further embodiments, the plurality of home-based EV chargers may be located within a twenty-five-mile radius of a planned location for the EV group charging event. In still further embodiments, the plurality of home-based EV chargers may be located within a fifty-mile radius of a planned location for the EV group charging event. In still further embodiments, the plurality of home-based EV chargers may be located within a hundred-mile radius of a planned location for the EV group charging event. In certain embodiments, the user data may be collected by the plurality of home-based EV chargers.

In some embodiments, the EV group charging event may be associated with another current event. In certain embodiments, the other current event may be a sporting event, a concert, a festival, a farmers' market, a flea market, a local community center event, a local convenience store event, and/or the like.

In some embodiments, the apparatus may further include a store having for sale items. In certain embodiments, the store is at least one of a convenience store, a grocery store, a drug store, a gift store, a food stand, and a food truck.

In some embodiments, the apparatus may further include facilities to provide services. In certain embodiments, the services may include restaurant services, hair salon services, nail salon services, massage services, medical services, dental services, tutorial services, counseling services, physical therapy services, entertainment servicers, religious services, and/or the like.

In some embodiments, the user data may include EV ownership type, EV driving routes, EV energy usage, EV ownership history, and/or the like.

In some embodiments, the user data may include user social networking information, user professional networking information, user technical profession organization information, and/or the like.

In some embodiments, the user data may include user purchasing information, user home ownership information, user home energy usage, and/or the like.

In some embodiments, the user data may include user referral information.

In some embodiments, the user device may be a smart phone, a smart tablet, a smart watch, a smart TV, a personal computer (PC), a laptop, a digital personal assistant device, a home-based EV charger, and/or the like.

In another embodiment, a non-transitory computer-readable storage medium is disclosed. The non-transitory computer-readable storage medium stores instructions to be implemented on at least one processor, the instructions when executed by the at least one processor cause the at least one processor to perform a method of facilitating an electric vehicle (EV) group charging event. The method includes receiving a scheduling availability for an apparatus. The apparatus includes a plurality of EV chargers configured to be coupled with an energy source and a computing device coupled with the plurality of EV chargers. The method further includes receiving user data associated with a plurality of EV users, determining a first EV user of the plurality of EV users to invite to the EV group charging event based on the user data and transmitting an invitation for the EV group charging event to a user device associated with the first EV user.

The features and advantages described in this summary and the following detailed description are not all-inclusive. Many additional features and advantages will be apparent to one of ordinary skill in the art in view of the drawings, specification, and claims presented herein.

BRIEF DESCRIPTION OF THE DRAWINGS

The present embodiments are illustrated by way of example and are not intended to be limited by the figures of the accompanying drawings. In the drawings.

DETAILED DESCRIPTION

The following description and drawings are illustrative and are not to be construed as limiting. Numerous specific details are described to provide a thorough understanding of the disclosure. However, in certain instances, well-known or conventional details are not described in order to avoid obscuring the description. References to "one embodiment" or "an embodiment" in the present disclosure can be, but not necessarily are, references to the same embodiment and such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

Figure 1:
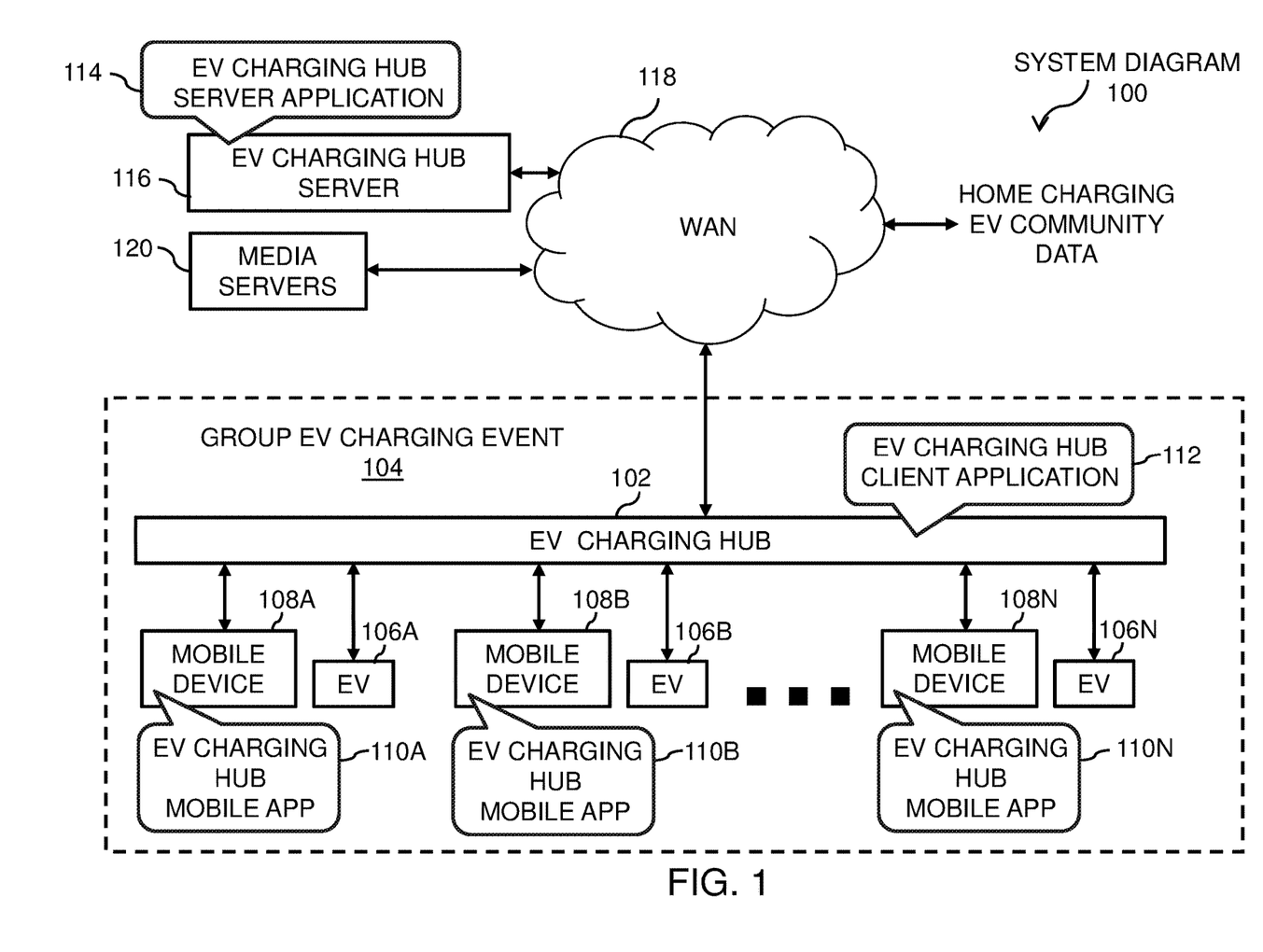
FIG. 1 depicts a system diagram illustrating an electric vehicle EV charging hub (i.e., apparatus) for facilitating an EV group charging event in accordance with embodiments of the present disclosure

Disclosed herein are methods, systems, and devices for simultaneous electric vehicle (EV) charging. Figure. 1 depicts a system diagram 100 illustrating an EV charging hub 102 (i.e., apparatus) for facilitating an EV group charging event 104 in accordance with embodiments of the present disclosure. The EV group charging event 102 may be associated with co-located current event. For example, the co-located current event may be a sporting event, a concert, a festival, a farmers' market, a flea market, a local community center event, a local convenience store event, and or the like.

The EV charging hub 102 is configured to provide simultaneous charging to a plurality of Evs 106A, 106B, -106N. The EV charging hub 102 may be a mobile apparatus. For example, the EV charging hub 102 may be a trailer, a self-propelled vehicle (e.g., a tractor-trailer, a food truck, etc.), a watercraft, (e.g., barge, self-propelled boat, etc.), and/or the like. The EV charging hub 102 is wirelessly coupled with a plurality of mobile devices 108A, 108B, -108B associated with a plurality of users (not shown in FIG. 1). The plurality of users may also be associated with the plurality of Evs 106A, 106B, -106N. The plurality of mobile devices 108A, 108B, -108N are configured to execute a plurality of EV charging hub mobile applications (apps) 110A, 110B, -110B. The plurality of EV charging hub mobile apps 110A, 110B, -110B are be configured to communicate with an EV charging hub client application 112 executing on the EV charging hub 102. The EV charging hub client application 112 is configured to communicate with an EV charging hub server application 114 executing on an EV charging hub server 116. The EV charging hub server 116 may be located in a cloud computing environment or another remote facility. The EV charging hub server application 114 may receive and/or transmit home charging EV community data to/from other servers and to/from a plurality of home-based EV chargers (not shown in FIG. 1). The home charging EV community data may include user data. For example, the user data may include EV ownership type, EV driving routes, EV energy usage, EV ownership history, user social networking information, user professional networking information, user technical profession organization information, user purchasing information, user home ownership information, user home energy usage, user referral information, and/or the like.

A wide area network (WAN) 118 provides connectivity between the EV charging hub server application 114 and the EV charging hub client application 112. The WAN 118 may include the Internet and any combination of 2G, 3G, 4G, and 5G networks. The WAN 118 may also include Data Over Cable Service Interface Specification (DOCSIS) networks and/or fiber networks such as passive optical networks (PONs). A plurality of media servers 120 are configured to provide media content to the EV charging hub client application 112 over the WAN 118. The media content may then be provided to the plurality of users associated with the plurality of Evs 106A, 106B, -106N. In certain embodiments, the media content may be determined based on a common attribute associated with a plurality of users associated with the plurality of Evs. The media content may be an advertisement, a product promotion, a product placement, and/or the like.

The EV charging hub 102 may include or be associated with a store having for sale items. For example, the store may be a convenience store, a grocery store, a drug store, a gift store, a food stand, a food truck, and or the like. The EV charging hub 102 may include or be associated with a facility for providing services for the plurality of users. For example, the services may include restaurant services, hair salon services, nail salon services, massage services, medical services, dental services, tutorial services, counseling services, physical therapy services, entertainment servicers, religious services, and/or the like.

Figure 2:
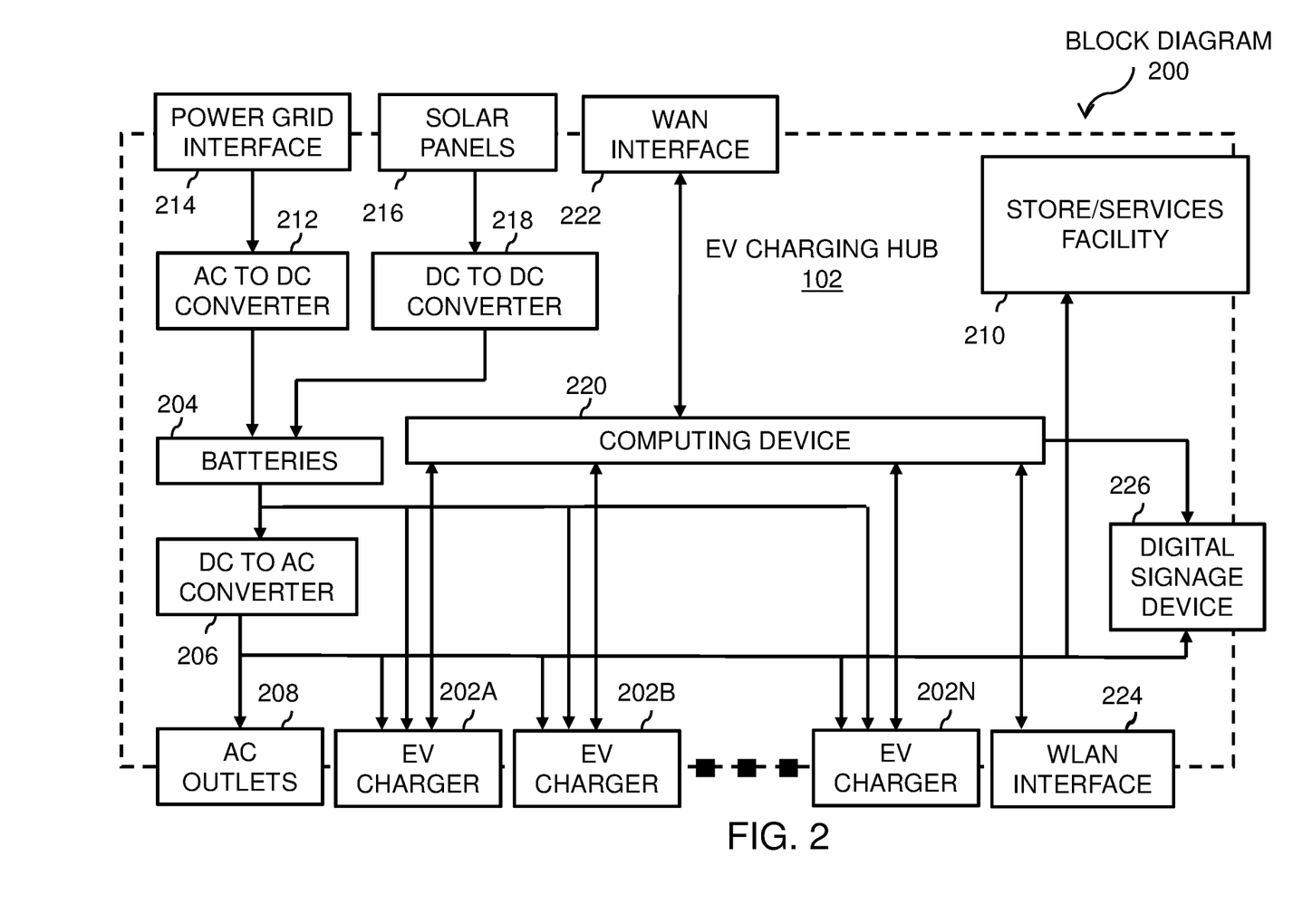
FIG. 2 depicts a block diagram illustrating one embodiment of the EV charging hub of FIG. 1 in accordance with embodiments of the present disclosure.

FIG. 2 depicts a block diagram 200 illustrating one embodiment of the EV charging hub 102 of FIG. 1 in accordance with embodiments of the present disclosure. The EV charging hub 102 includes a plurality of EV chargers 202A, 202B, -202N electrically coupled via a direct current (DC) bus with a plurality of batteries 204 (i.e., an energy source). The plurality of batteries 204 may be configured in a battery cabinet (not shown in FIG. 2). The battery cabinet may be a lead acid battery or a lithium battery cabinet. The battery cabinet may include a mixture of lead acid batteries and lithium batteries.

A DC to alternating current (AC) converter 206 is also electrically coupled with the DC bus. The DC to AC converter 206 is configured to provide AC power to a plurality of AC outlets 208 and to the plurality of EV chargers 202A, 202B, -202N. The DC to AC converter 206 is also configured to provide AC power to a store and/or services facility 210 included with the EV charging hub 102. In some embodiments the store and/or services facility 210 may be decoupled from the EV charging hub 102. In certain embodiments, the DC to AC converter 206 may be a split-phase inverter. An AC to DC converter 212 is configured to receive AC power via a power grid interface 214 and provide charging for the plurality of batteries 204. The power grid interface 214 may be configured to be electrically coupled with an on-grid power distribution line. In other embodiments, the power grid interface 214 may be configured to be coupled with an off-grid energy source. For example, the off-grid energy source may be a solar farm, a wind farm, and/or the like.

In some embodiments (not shown in FIG. 2), the EV charging hub 102 may include an electric generator. The electric generator may be a direct current (DC) electric generator configured for charging the plurality of batteries 204. In other embodiments, the electric generator may be an AC electric generator configured to replace the plurality of batteries 204 and the DC to AC converter 206. The electric generator may be mechanically coupled with an engine of the EV charging hub 102 that is configured for moving the EV charging hub 102 between locations. In some embodiment, the electric generator may be mechanically coupled with a hydraulic motor.

Solar panels 216 are electrically coupled with a DC to DC converter 218. The DC to DC converter is also configured to provide charging for the plurality of batteries 204. In some embodiments (not shown in FIG. 2), the AC to DC converter 212 and/or the DC to DC converter 218 may be electrically coupled with the DC bus via one or more isolation diodes. The solar panels 216 may be incorporated in a solar panel array. The solar panel array may be adjustable on one axis or two axes. The solar panel array may be retractable for movement of the EV charging hub 102 from a first location to a second location. The solar panel array may be configured for providing shelter from weather for the plurality of Evs 106A, 106B, -106N and their associated users. For example, the solar panel array may be configured for providing shade and or protection from precipitation.

The EV charging hub 102 also includes a computing device 220 configured to provide control and monitoring of the plurality of EV chargers 202A, 202B, -202N. The computing device 220 is electrically coupled with a WAN interface 222 and a WLAN interface 224. The WAN interface 222 is configured to be coupled with the WAN 118 of FIG. 1.

The WLAN interface 224 is configured to provide digital connectivity to the plurality of EV chargers 202A, 202B, -202N; the plurality of the mobile devices 108A, 108B, -108N, and to one or more devices associated with the store and/or services facility 210 (as discussed in FIG. 1). The computing device may be further configured for providing the media content to the plurality of users via the WLAN interface 224. The WLAN interface 224 may include circuitry compliant to at least one version of an Institute of an Electrical and Electronics Engineers® (IEEE®) 801.11 standard, an IEEE® 802.15.4 standard, a Bluetooth® Special Interest Group (SIG) standard, a Z-Wave® Alliance standard, a LoRA® Alliance standard, and/or the like.

The computing device may also be configured to provide a point of sale (POS) for providing EV charging and/or with the store and/or services facility 210. The computing device may also be configured for determining a current event based on a current time and a current location of the EV charging hub 102, and determining a common attribute of the plurality of users based on the current event.

A digital signage device 226 is electrically coupled with the computing device 220 and configured to provide media content received by the WAN interface 222 to the plurality of users as disclosed in FIG. 1. One or more amplifiers and one or more speakers (not shown in FIG. 2) may also be included to provide the media content to the plurality of users. The media content may be associated with the store and/or services facility 210.

Figure 3:
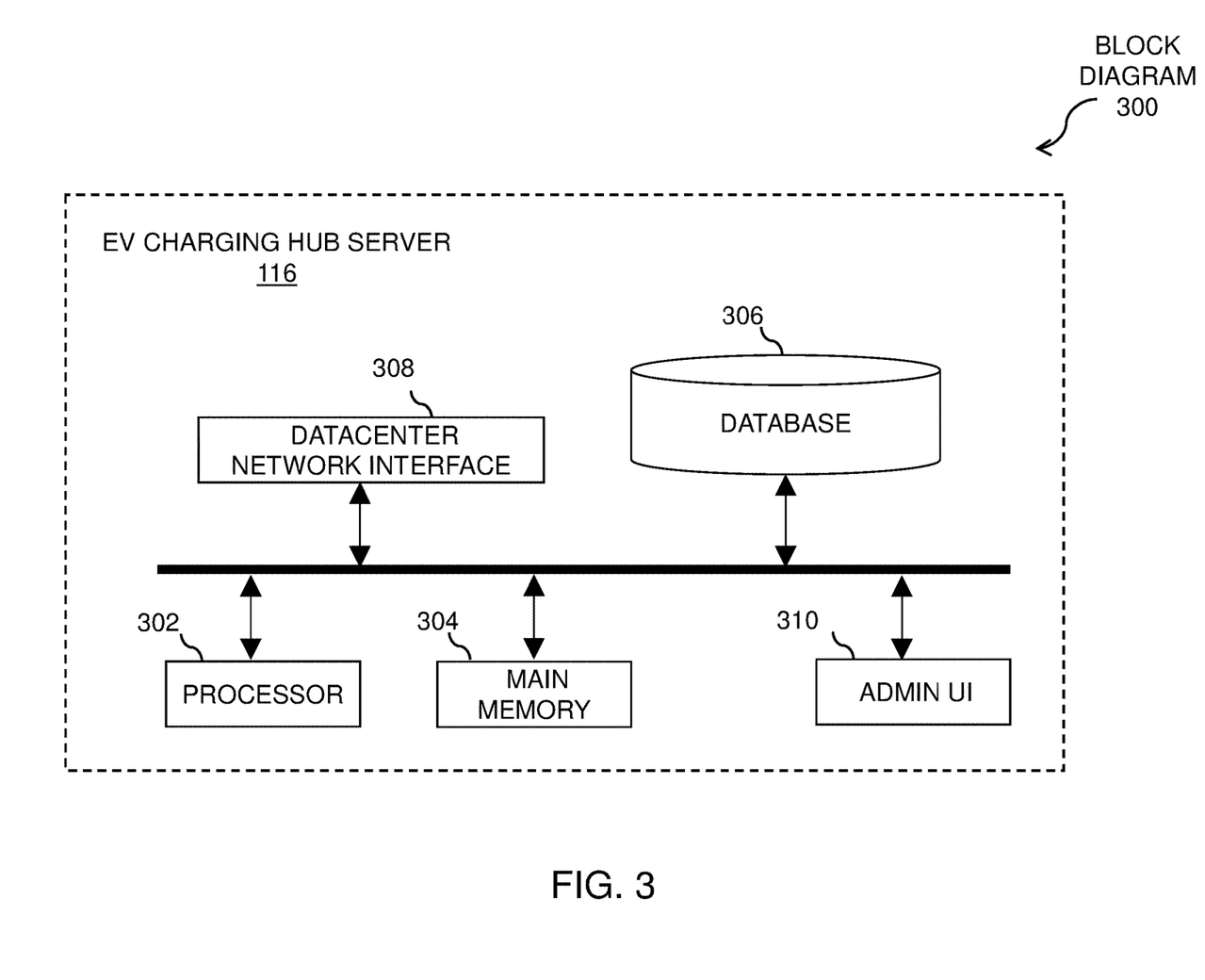
FIG. 3 depicts a block diagram illustrating an EV charging hub server of FIG. 1 in accordance with embodiments of the present disclosure.

FIG. 3 depicts a block diagram 300 illustrating the EV charging hub server 116 of FIG. 1 in accordance with embodiments of the present disclosure. The EV charging hub server 116 includes at least one of processor 302, a main memory 304, a storage memory (e.g., database) 306, a datacenter network interface 308, and an administration user interface (UI) 310. The EV charging hub server 116 may be configured to host an Ubuntu® server. In some embodiments Ubuntu® server may be distributed over a plurality of hardware servers using hypervisor technology.

The processor 302 may be a multi-core server class processor suitable for hardware virtualization. The processor may support at least a 64-bit architecture and a single instruction multiple data (SIMD) instruction set. The main memory 304 may include a combination of volatile memory (e.g., random access memory) and non-volatile memory (e.g., flash memory). The database 306 may include one or more hard drives. The database 306 may be configured to store a plurality of charging enabled parking space influenced media data.

The datacenter network interface 308 may provide one or more high-speed communication ports to the data center switches, routers, and/or network storage appliances. The datacenter network interface 2108 may include high-speed optical Ethernet, InfiniBand (IB), Internet Small Computer System Interface (Iscsi), and/or Fibre Channel interfaces. The administration UI may support local and/or remote configuration of the EV charging hub server 116 by a datacenter administrator.

Figure 4:
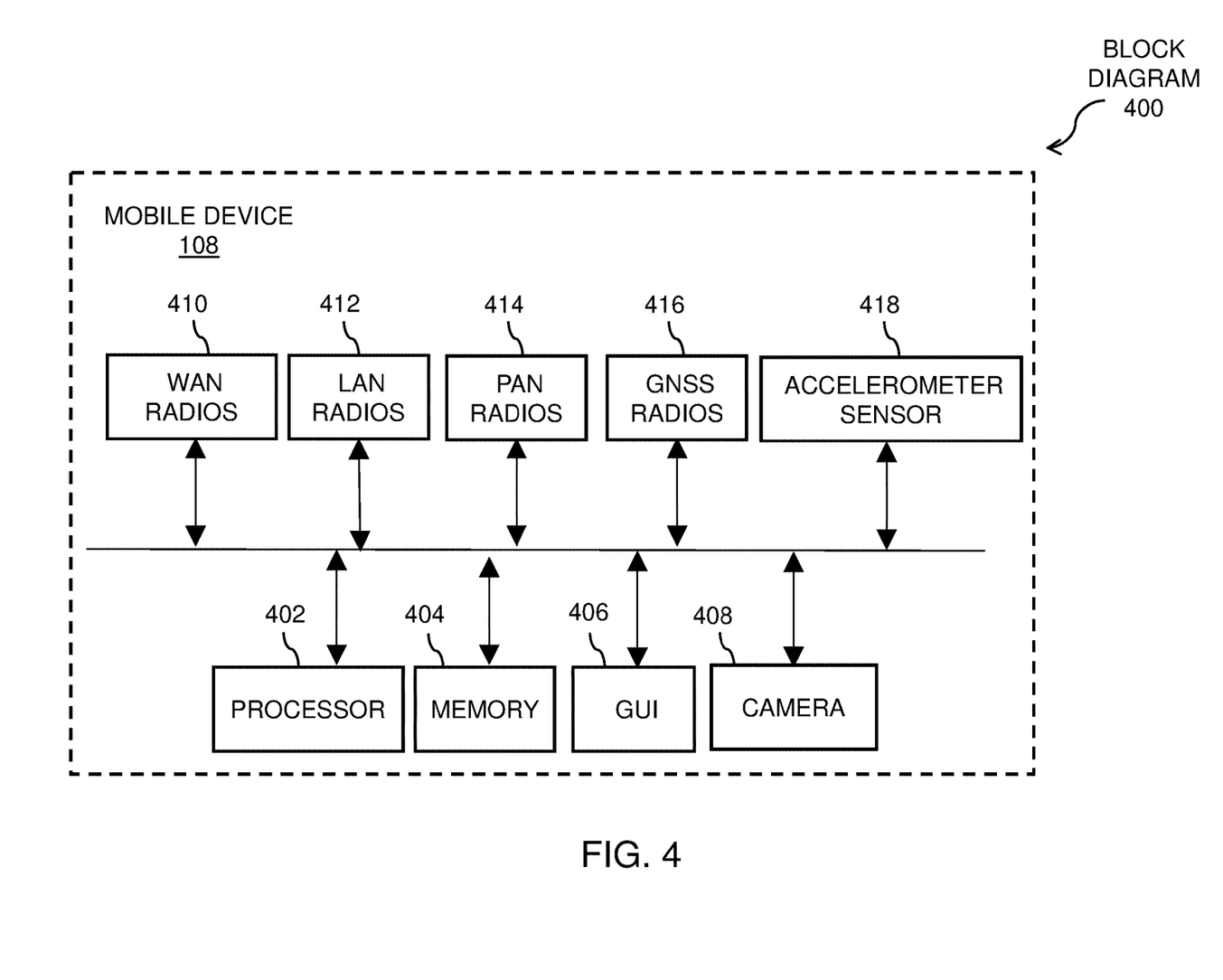
FIG. 4 depicts a block diagram further illustrating a mobile device of FIG. 1 in accordance with embodiments of the present disclosure.

FIG. 4 depicts a block diagram 400 further illustrating the mobile device 108 of FIG. 1 in accordance with embodiments of the present disclosure. The mobile device 108 may be a smart phone (e.g., cell phone), a tablet, a laptop, a smart watch, or the like. The mobile device includes a processor 402, a memory 404, a GUI 406, a camera 408, wide area network (WAN) radios 410, local area network (LAN) radios 412, personal area network (PAN) radios 414, global navigation satellite system (GNSS) radios 416, and one or more accelerometer sensors 418.

In some embodiments, the mobile device 108 may be an iPhone® or an iPad®, using Ios® as an OS. In other embodiments, the mobile device 208 may be a mobile terminal including Android® OS, BlackBerry® OS, Windows Phone® OS, or the like.

In some embodiments, the processor 402 may be a mobile processor such as the Qualcomm® Snapdragon™ mobile processor. The memory 404 may include a combination of volatile memory (e.g., random access memory) and non-volatile memory (e.g., flash memory). The memory 404 may be partially integrated with the processor 402. The GUI 406 may be a touchpad display. The WAN radios 410 may include 2G, 3G, 4G, and/or 5G technologies. The LAN radios 412 may include Wi-Fi technologies such as 802.11a, 802.11b/g/n, 802.11ac, 802.11.ax or the like circuitry. The PAN radios 414 may include Bluetooth® technologies.

Figure 5:
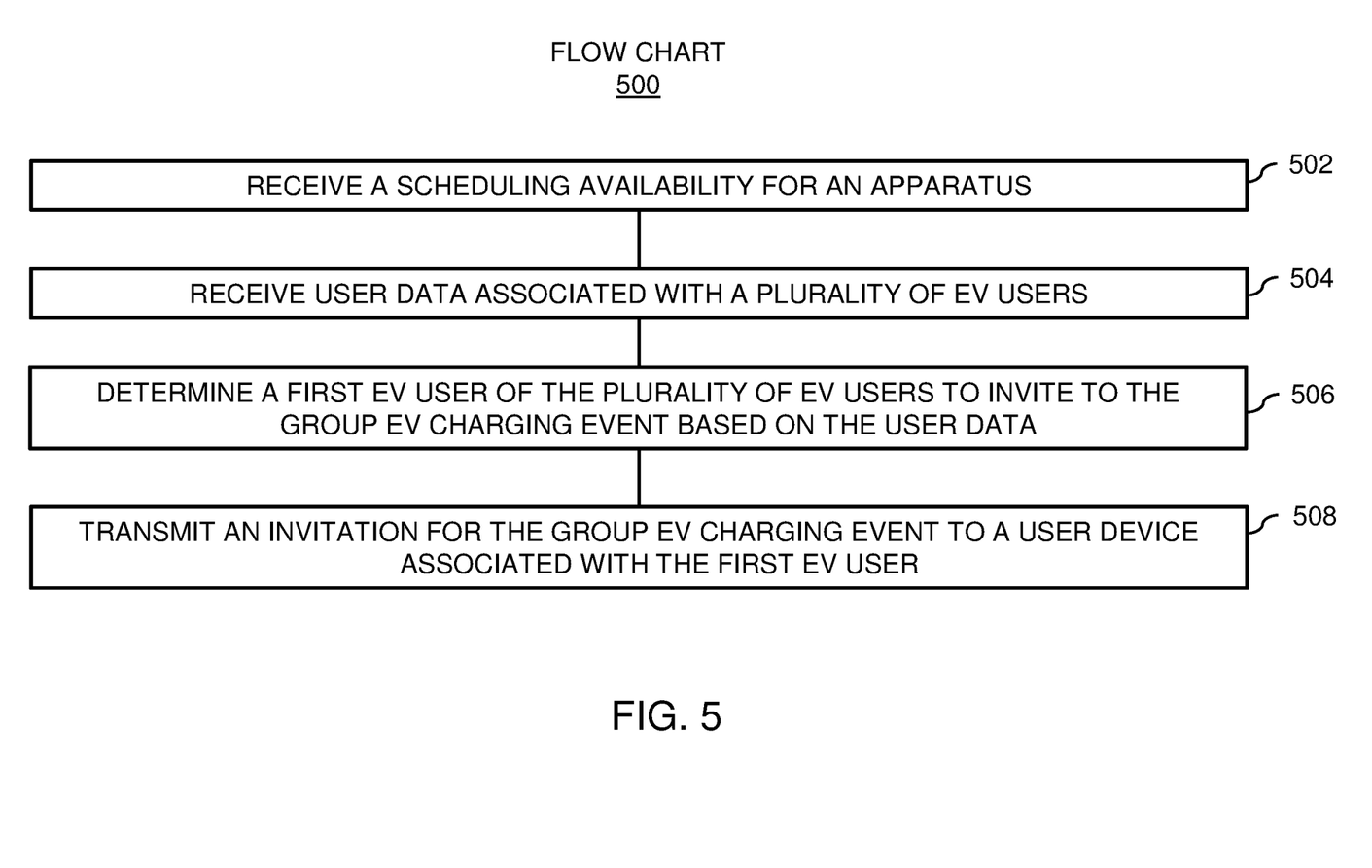
FIG. 5 depicts a flowchart illustrating a method for facilitating an EV group charging event in accordance with embodiments of the present disclosure.

In another embodiment, FIG. 5 depicts a flowchart 400 illustrating a method for facilitating an EV group charging event in accordance with embodiments of the present disclosure. The EV group charging event may be associated with another current event. The other current event may be a sporting event, a concert, a festival, a farmers' market, a flea market, a local community center event, a local convenience store event, and/or the like.

In step 502, the method includes receiving a scheduling availability for an apparatus. The apparatus includes a plurality of EV chargers configured to be coupled with an energy source and a computing device coupled with the plurality of EV chargers (e.g., see FIG. 1) The apparatus may include a store having for sale items. The store may be a convenience store, a grocery store, a drug store, a gift store, a food stand, a food truck, and/or the like. The apparatus may include facilities to provide services. The services may include restaurant services, hair salon services, nail salon services, massage services, medical services, dental services, tutorial services, counseling services, physical therapy services, entertainment servicers, religious services, and/or the like.

In step 504, the method further includes receiving user data associated with a plurality of EV users. The plurality of EV users may be associated with a plurality of home-based EV chargers. The user data may be collected by the plurality of home-based EV chargers. The user data may include EV ownership type, EV driving routes, EV energy usage, EV ownership history, and/or the like. The user data may include user social networking information, user professional networking information, user technical profession organization information, and/or the like. The user data may include user purchasing information, user home ownership information, user home energy usage, and/or the like. Additionally, the user data may include user referral information. The plurality of home-based EV chargers may be located within a five-mile radius of a planned location for the EV group charging event. In other embodiments, the plurality of home-based EV chargers may be located within a twenty-five-mile radius of a planned location for the EV group charging event. In still other embodiments, the plurality of home-based EV chargers is located within a fifty-mile radius of a planned location for the EV group charging event. In still other embodiments, the plurality of home-based EV chargers is located within a hundred-mile radius of a planned location for the EV group charging event.

In step 506, the method further includes determining a first EV user of the plurality of EV users to invite to the EV group charging event based on the user data.

In step 506, the method further includes transmitting an invitation for the EV group charging event to a user device associated with the first EV user. The user device may be a smart phone, a smart tablet, a smart watch, a smart TV, a PC, a laptop, a digital personal assistant device, a home-based EV charger, and/or the like.

Figure 6:
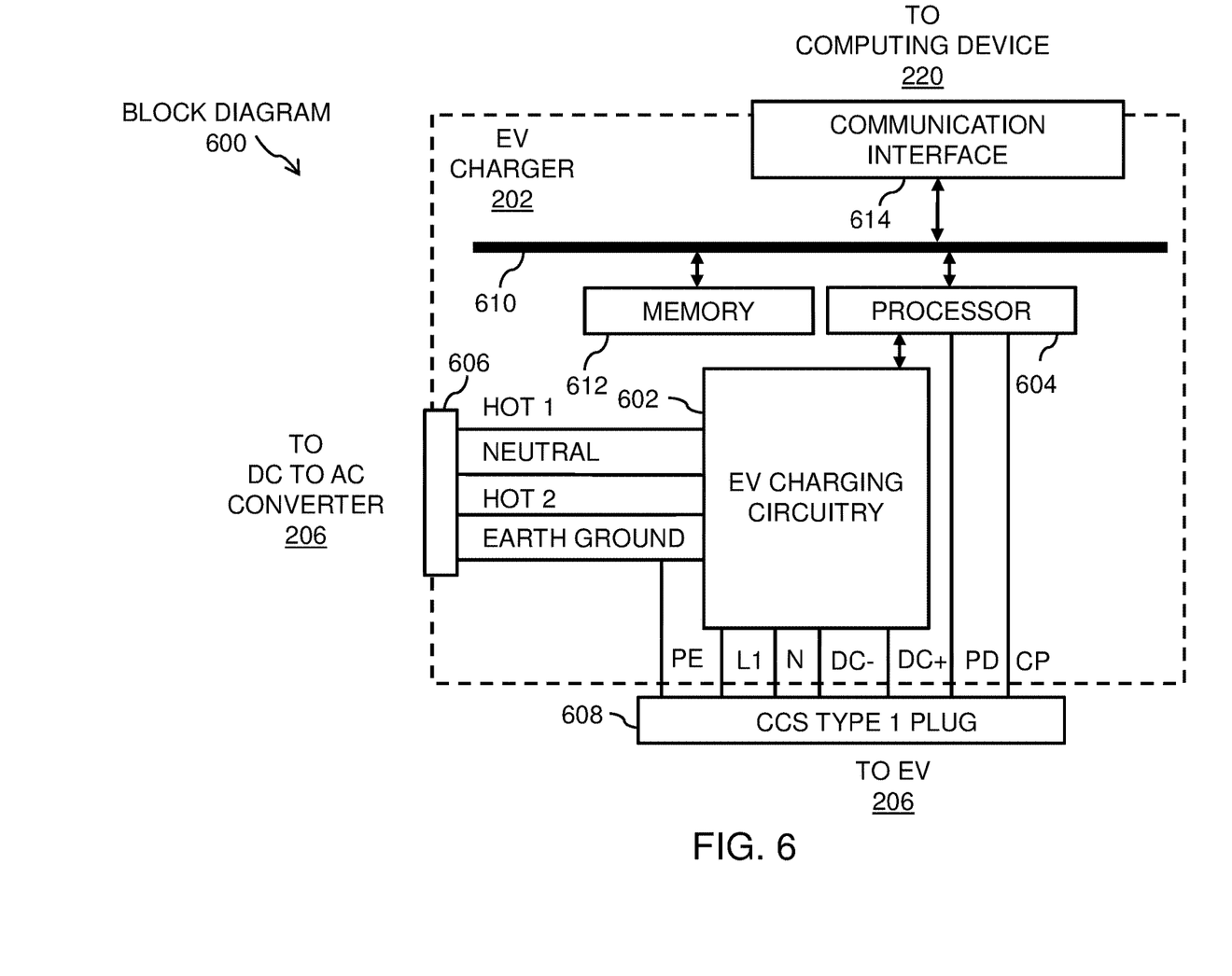
FIG. 6 depicts a block diagram further illustrating an EV charger of FIG. 2 in accordance with embodiments of the present disclosure.

FIG. 6 depicts a block diagram 600 further illustrating the EV charger 202 of FIG. 2 in accordance with embodiments of the present disclosure. The EV charger 202 includes EV charging circuitry 602 and a processor 604. The EV charger 202 also includes an electrical interface 606 for connecting to the DC to AC converter of FIG. 2. The electrical interface 606 includes electrical connections for Grid Hot 1, Grid Hot 2, Grid Neutral, and earth ground as a split-phase grid connection as is commonly known in the art.

The EV charger 102 also includes an electrical interface 608 for electrically coupling a charging cord for charging the EV 106 of FIG. 1. The electrical interface 208 may be compliant with a Combined Charging System (CCS) Type 1 connection.

The processor 604 is configured to monitor a Proximity Detection (PD) contact to confirm connection to the EV 106. The processor 604 is further configured to monitor a control pilot (CP) contact to maintain a charging rate within a safe operating limit of the EV 106. The EV charging circuitry 602 is configured to provide AC power to the electrical interface 608. The EV charging circuitry 602 includes switch circuitry for enabling and/or disabling AC power to the electrical interface 608 via a first AC (L1) contact and a second AC (N) contact. The L1 contact and the N contact provide AC power to internal charging circuitry within the EV 106. The switch circuitry may include a relay and the relay may be a solid-state relay. The EV charging circuitry 602 may also include an AC-to-DC rectifier for providing DC power to the electrical interface 608 via a DC+ contact and a DC− contact. The DC+ contact and the DC− contact provide charging current to the battery pack of the EV 106 in this scenario.

An address/data bus 610 communicatively couples the processor 604 with a memory 612. In some embodiments, the memory 612 or a portion of the memory 612 may be integrated with the processor 604. The memory 612 may include a combination of volatile memory and non-volatile memory. In some embodiments the processor 604 and the memory 612 may be embedded in a microcontroller.

The address/data bus 610 also communicatively couples the processor 604 with a communication interface 614. The communication interface 614 is communicatively coupled with the computing device 220 of FIG. 2. The communication interface 614 may be a wired communication interface or a wireless communication interface. The communication interface may be a LAN interface or a PAN interface. The LAN interface may include an Ethernet interface and/or wireless LAN interfaces such as Wi-Fi (e.g., 802.11a, 802.11b/g/n, and/or 802.11ac circuitry). The PAN interface may be a Bluetooth® interface, a Universal Serial Bus (USB®) interface, or the like. The communication interface 164 may be an external bus interface (EBI), a controller area network (CAN) bus interface, or the like.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An apparatus for facilitating an electric vehicle (EV) group charging event, the apparatus comprising:
   a plurality of EV chargers configured to be coupled with an energy source; and
   a computing device coupled with the plurality of EV chargers, wherein:
      the plurality of EV chargers are configured to simultaneously charge a plurality of EVs associated with a plurality of EV users;

the apparatus is a mobile apparatus;

the computing device is configured to be communicatively coupled to a server over a wide area network (WAN);

the server is configured for determining a first EV user to invite to the EV group charging event based on user data received from a plurality of home-based EV chargers over the WAN, wherein the user data comprises EV energy usage; and the computing device is further configured for controlling the plurality of EV chargers based on the user data.

2. The apparatus of claim 1 further comprising the energy source.

3. The apparatus of claim 2, wherein the energy source includes a solar panel array.

4. The apparatus of claim 3, wherein the solar panel array is adjustable on at least two axes.

5. The apparatus of claim 3, wherein the solar panel array is retractable for movement of the apparatus from a first location to a second location.

6. The apparatus of claim 3, wherein the solar panel array is configured for providing shelter from weather to the plurality of EVs.

7. The apparatus of claim 2, wherein the energy source includes an electric generator.

8. The apparatus of claim 1, wherein the energy source is an off-grid energy source.

9. The apparatus of claim 8, wherein the off-grid energy source is at least one of a solar farm and a wind farm.

10. The apparatus of claim 1, wherein the computing device is configured for
monitoring the energy source.

11. The apparatus of claim 1 further comprising at least one of a store having for sale items and a facility for providing services.

12. The apparatus of claim 11, wherein the store is at least one of a convenience store, a grocery store, a drug store, a gift store, a food stand, and a food truck.

13. The apparatus of claim 11, wherein the services include at least one of restaurant services, hair salon services, nail salon services, massage services, medical services, dental services, tutorial services, counseling services, physical therapy services, entertainment servicers, and religious services.

14. The apparatus of claim 1 further comprising a digital signage device electrically coupled with the computing device, wherein:

the computing device is further configured for displaying media content to the plurality of EV users via the digital signage device; and the media content is determined based on a common attribute associated with the plurality of EV users.

15. The apparatus of claim 14, wherein the computing device is further configured for:

receiving a plurality of identifiers associated with a plurality of client devices associated with the plurality of EV users;

receiving a plurality of profiles associated with the identifiers; and determining the common attribute based on the plurality of profiles.

16. The apparatus of claim 15, wherein the computing device is further configured for further determining the common attribute based on a plurality of purchasing histories associated with the plurality of profiles.

17. The apparatus of claim 15, wherein the computing device is configured for:

determining a current location of the apparatus; and determining the common attribute is further based on the current location.

18. The apparatus of claim 17, wherein the computing device is configured for:

determining a current event based on a current time and a current location of the apparatus; and determining the common attribute based on the current event.

19. The apparatus of claim 14, wherein the computing device is further configured for receiving the media content via the WAN.

20. A method for facilitating an electric vehicle (EV) group charging event, the method comprising:

receiving a scheduling availability for a mobile apparatus comprising:

a plurality of EV chargers configured to be coupled with an energy source; and a computing device coupled with the plurality of EV chargers, wherein the computing device is configured to be communicatively coupled to a server over a wide area network (WAN)

receiving user data from a plurality of home-based EV chargers associated with a plurality of EV users over the WAN, wherein the user data comprises EV energy usage;

determining a first EV user of the plurality of EV users to invite to the EV group charging event based on the user data; and transmitting an invitation for the EV group charging event to a user device associated with the first EV user, wherein the computing device is further configured for controlling the plurality of EV chargers based on the user data.

21. A non-transitory computer-readable storage medium storing instructions to be implemented on at least one processor, the instructions when executed by the at least one processor cause the at least one processor to perform a method of facilitating an electric vehicle (EV) group charging event, the method comprising:

receiving a scheduling availability for a mobile apparatus comprising:

a plurality of EV chargers configured to be coupled with an energy source; and a computing device coupled with the plurality of EV chargers, wherein the computing device is configured to be communicatively coupled to a server over a wide area network (WAN)

receiving user data from a plurality of home-based EV chargers associated with a plurality of EV users over the WAN, wherein the user data comprises EV energy usage;

determining a first EV user of the plurality of EV users to invite to the EV group charging event based on the user data; and transmitting an invitation for the EV group charging event to a user device associated with the first EV user, wherein the computing device is further configured for controlling the plurality of EV chargers based on the user data.

* * * * *